May 18, 1971 HIROTOSHI SAMEJIMA ET AL 3,579,357
FOODSTUFFS CONTAINING AN ANTIOXIDANT
Filed Jan. 15, 1968
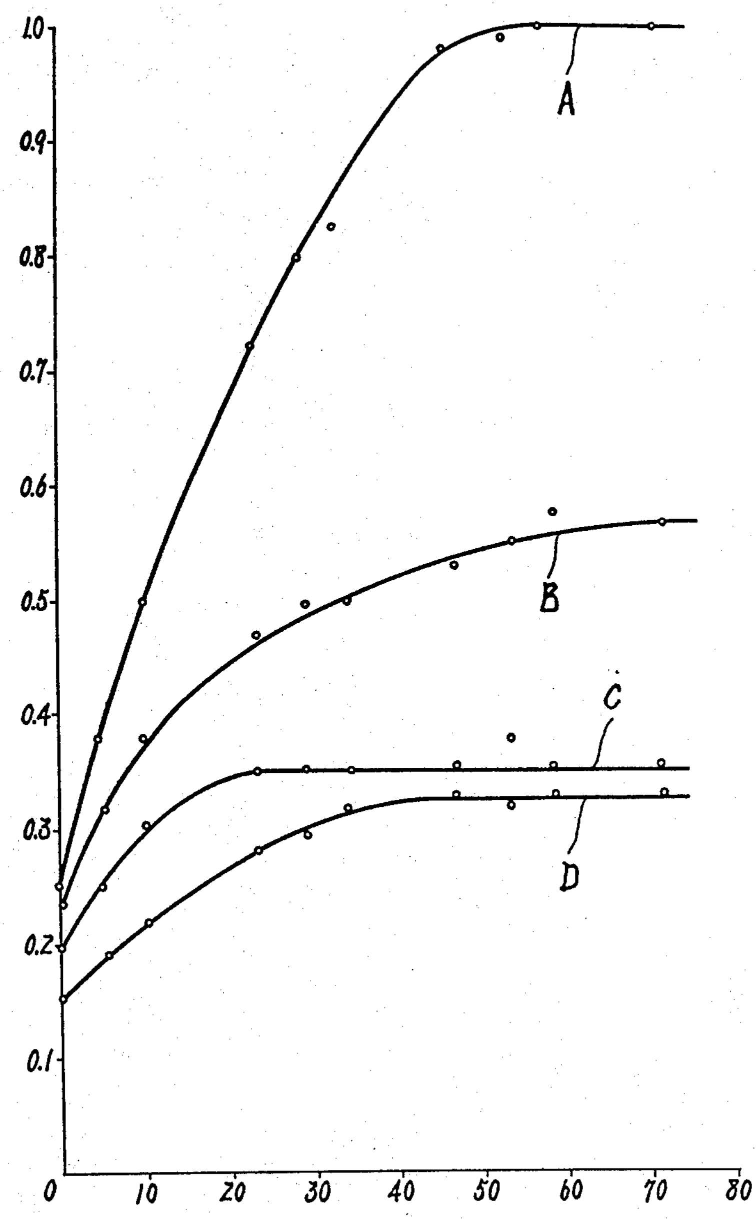
INVENTORS
HIROTOSHI SAMEJIMA
KIYOSHI NAKAYAMA
YUJI NAGANO
BY Bacon & Thomas
ATTORNEYS United States Patent Office 3,579,357
Patented May 18, 1971

3,579,357

FOODSTUFFS CONTAINING AN ANTIOXIDANT

Hirotoshi Samejima, Machida-shi, Tokyo-to, Kiyoshi Nakayama, Sagamihara-shi, and Yuji Nagano, Machida-shi, Tokyo-to, Japan, assignors to Kyowa Hakko Kogyo Kabushiki Kaisha, Tokyo-to, Japan Filed Jan. 15, 1968, Ser. No. 697,771
Claims priority, application Japan, Jan. 16, 1967, 42/2,731
Int. Cl. A23b *7/00*; A23l *3/34*
U.S. Cl. 99—154 3 Claims

ABSTRACT OF THE DISCLOSURE

There are provided compositions comprising at least one substance susceptible to oxidation by atmospheric air and a compound of the formula $$R—S—(CH_2)_n—NH_2$$

wherein R represents a hydrogen atom or a lower alkyl group and *n* is 2 or 3. The oxidation of the substance is greatly inhibited.

This invention is concerned with the use of anti-oxidants to inhibit or prevent the oxidation of substances susceptible to oxidation by atmospheric air, such substances including for example pharmacologically-active compounds and human and animal foodstuffs.

It is important for stabilizing the properties of various medicaments and human and animal foodstuffs to inhibit or prevent oxidation thereof. Antioxidants, which have recently increasingly been used for this purpose, include for example butyl hydroxy anisole (BHA), nordihydroguaiaretic acid (NDGA) and propyl gallete (PG). However, these conventional anti-oxidants cannot always satisfy practical requirements of consumers, and in particular it has been long desired to obtain anti-oxidants which may be used for practical purposes in the form of aqueous solution.

The present invention is based upon the discovery of anti-oxidants which are water-soluble and which have a useful anti-oxidant action when in aqueous solution.

According to the present invention, there is provided a composition comprising at least one substance susceptible to oxidation by atmospheric air and a compound of the formula:

$$R—S—(CH_2)_n—NH_2 \quad (I)$$

(wherein R represents a hydrogen atom or a lower alkyl group and *n* is 2 or 3) or an acid addition salt thereof serving as an anti-oxidant for the said substance.

The compositions according to the invention preferably contain the anti-oxidant in the form of an aqueous solution thereof. In the Formula I, R represents a hydrogen atom or a lower alkyl group such as for example methyl, ethyl, propyl, butyl or amyl groups. The substances subject to oxidation by atmospheric air at ambient temperatures include for example pharmacologically-active compounds and human and animal foodstuffs. In compositions according to the invention containing such substances, the compound of Formula I should in general be in the form of its free base or non-toxic acid addition salt. A preferred non-toxic acid addition salt is the hydrochloride.

A process for the preparation of 3-methylthiopropylamine hydrochloride, an antioxidant particularly suitable for incorporation in compositions according to the present invention, is described in Agricultural Biological Chemistry, vol. 30, 706 (1966). An example of this process is as follows:

7.45 grams (0.05 mol) DL-methionine and 12 ml. (0.01 mol) of acetophenone are introduced into a distillation flask and heated at 170° C. for 30 minutes on an oil bath. During heating, carbon dioxide gas is generated. 50 ml. of ether are added to the solution which is then extracted with 2 N hydrochloric acid. The aqueous layer is removed from the extract, concentrated and excess hydrochloric acid removed therefrom. The solution is then decolorized by treatment with active carbon followed by evaporation to dryness in vacuo. The substance obtained is dissolved in 30 ml. of acetone and cooled to yield 6.5 grams of a crude product. The crude product is recystallized using ethanol and acetone to give 4.9 grams of 3-methylthiopropylamine hydrochloride, in the form of leaf-like crystals.

The 3-methylthiopropylamine hydrochloride obtained is characterised as follows:

Melting point 144° C.

*Analysis.*—Calcd. as $C_4H_{12}S.HCl$ (percent): C, 33.92; H. 8.48; N, 9.47. Found (percent): C, 33,90; H, 8.48; N, 9.89.

The anti-oxidant compounds of Formula I are especially active when present in compositions according to the invention in concentrations of 0.01 to 0.1% by weight. The property of one compound of Formula I as an antioxidant is demonstrated and compared with the properties of known anti-oxidants in the following experiments.

The substance subject to oxidation by atmospheric air used in these experiments was sodium linoleate. The substance was dissolved in an aqueous solution and was oxidized by heating to a pre-determined temperature. The oxide obtained was periodically estimated as a measure of the anti-oxidant action of the compound under test.

1.4 grams of linoleic acid were dissolved in 5 ml. of 1 N caustic soda solution. The solution was diluted with 500 ml. of 0.02 M boric acid buffer solution having a pH of 9.0, and was used as the substance subject to oxidation. 200 ml. of the solution (0.2 mol of linoleic acid) was mixed in a test tube with 10 ml. of 0.01 M anti-oxidant solution (0.1 millimol of the antioxidant to be tested). The antioxidants used were ascorbic acid, butyl hydroxy anisole; and 3-methylthiopropylamine hydrochloride.

Each test solution was maintained at 37° C. on a water bath and 2 ml. samples of the solution were periodically taken. Each of the samples was treated with 2 ml. of 0.75% thiobarbituric acid followed by heating in boiling water for 15 min. The absorbance of the red color thereby developed was determined at 535 mμ, and this provided a measure of the degree of oxidation. Graphs plotted from the results obtained are shown in the accompanying drawing. Each graph is a plot of the absorbance against time in hours. Graph A is of a control experiment with no antioxidant used. Graphs B, C and D are in respect of the antioxidants ascorbic acid, 3-methyl-thiopropylamine hydrochloride and butylhydroxyanisole respectively. The graphs show that 3-methylthiopropylamine hydrochloride has an antioxidant action higher than that of ascorbic acid, and almost equal to that of the widely-used butyl hydroxy anisole. Furthermore, it is advantageous that 3 - methylthiopropylamine in its free base form or salt form is highly soluble not only in water but also in oil and fat.

The following non-limitative examples illustrate the invention.

EXAMPLE 1

100 grams of fried potato chips were prepared by frying sliced potato available upon the free market at about 140–160° C. in natural butter (200 grams) to which was added 0.1 gram (0.05% by weight of butter) of 3 - methylthiopropylamine hydrochloride and were sealed into a polyethylene envelope, which was kept at 40° C. in order to determine at intervals the formation of peroxides (POV). The following POV values were obtained by extracting the sample with ether, removing ether from the extract and measuring the POV value in a similar manner to that according to the A.O.C.S. method:

POV VALUE (Meq./kg.)

| Day | 0 | 7 | 14 | 21 | 28 | 35 | 42 |
|---|---|---|---|---|---|---|---|
| Control [1] | 3.05 | 4.89 | 15.1 | 27.8 | 49.1 | 60.7 | 95.6 |
| Sample [2] | 2.41 | 2.35 | 4.61 | 7.26 | 7.90 | 12.3 | 11.8 |

[1] Without addition of 3 methylthiopropylamine HCl.
[2] With addition of 3-methylthiopropylamine HCl (0.05% by weight).

It is apparent from the above-mentioned results that the addition of 3-methylthiopropylamine HCl can well prevent the oxidation of fried potato chips.

EXAMPLE 2

0.13 gram of 3-methylthiopropylamine hydrochloride dissolved in 10 ml. of water was added to a mixed non-human foodstuff composed of 100 grams of exoleated soybeans and 50 grams of fish meal with good stirring. The mixture was kept at 40° C. in a sealed polyethylene vessel. POV values were at intervals determined in a similar manner to that described in Example 1 to give the following results:

POV VALUE (Meq./kg.)

| Day | 0 | 14 | 28 | 42 |
|---|---|---|---|---|
| Control [1] | 0.98 | 15.6 | 84.3 | 419.0 |
| Sample [2] | 0.93 | 14.0 | 21.0 | 33.6 |

See footnotes 1, 2 of Example 1.

It is apparent from the results that the liability of such non-human foodstuffs as exoleated soybean and fish meal to oxidation can be well inhibited by the addition of 3-methylthiopropylamine HCl (0.05% by weight).

What we claim is:

1. A composition comprising a substance susceptible to oxidation by atmospheric air selected from the group consisting of human and animal foodstuffs and from 0.01% to 0.1% by weight of an antioxidant, said antioxidant being selected from the group consisting of:

(a) a compound of the formula:

$$R—S—(CH_2)_n—NH_2$$

wherein R is a member selected from the group consisting of H, methyl, ethyl, propyl, butyl and amyl, and *n* is one of the integers 2 and 3, and (b) a non-toxic acid addition salt thereof.

2. A composition according to claim 1 wherein R is methyl.

3. A composition according to claim 1 wherein the antioxidant is a hydrochloride acid addition salt.

References Cited

Obata et al.: Agr. Biol. Chem., vol. 30, No. 7, pp. 706–708, 1966.

ALBERT T. MEYERS, Primary Examiner

D. J. FUNDERBURK, Assistant Examiner

U.S. Cl. X.R.

99—2, 150, 158; 252—402; 424—175